United States Patent [19]

Greene

[11] Patent Number: 5,494,002
[45] Date of Patent: Feb. 27, 1996

[54] ANIMAL TRAINING DEVICE

[76] Inventor: Teddy R. Greene, 11025 Sorrento Valley Ct., San Diego, Calif. 92121

[21] Appl. No.: 284,865

[22] Filed: Aug. 2, 1994

[51] Int. Cl.⁶ .................................................. A01K 27/00
[52] U.S. Cl. ......................... 119/719; 119/795; 119/905; 119/908; 340/668
[58] Field of Search ........................... 119/719, 905, 119/908, 795, 796, 797, 798; 340/548, 573, 668, 391.1; 446/404

[56] References Cited

U.S. PATENT DOCUMENTS

| | | | |
|---|---|---|---|
| 3,072,097 | 1/1963 | Morchand | 119/719 |
| 3,643,250 | 2/1972 | Sander | 340/668 |
| 3,868,662 | 2/1975 | Russell, Jr. | 340/668 |
| 4,227,189 | 10/1980 | Davis | 340/668 |
| 4,384,425 | 5/1983 | Lemons, Sr. | 340/668 |
| 4,476,810 | 10/1984 | Heras | 119/908 |
| 4,681,303 | 7/1987 | Grassano | 340/573 |
| 4,846,462 | 7/1989 | Regnier et al. | 340/668 |
| 4,914,423 | 4/1990 | Fernandez | 340/668 |
| 5,351,653 | 10/1994 | Marischen et al. | 119/719 |

*Primary Examiner*—Todd E. Manahan
*Attorney, Agent, or Firm*—Townsend and Townsend and Crew

[57] ABSTRACT

An animal training device comprises an elongate body having opposite ends and retaining rings proximate each end to couple the body to a conventional leash. A trigger extends laterally from the body to contact the leash. The trigger is responsive to a force exerted thereon by the leash so that tensioning of the leash activates a sound generator. The sound generator, when activated, emits a sound having a preselected frequency to startle the animal so that it eventually learns to avoid the sound and walk safely at the owner's side.

16 Claims, 3 Drawing Sheets

5,494,002

ANIMAL TRAINING DEVICE

FIELD OF THE INVENTION

This invention relates to an animal training device, and more particularly to an electronic animal behavior modification device that attaches to any conventional leash.

BACKGROUND OF THE INVENTION

It is a great challenge to train a pet animal, such as a dog, to behave on a leash. The animal's natural instinct is to pull on the leash which forces the owner to expend energy to control the animal. Large animals often exert such forces on their leashes as to tax the owner or possibly exceed the ability of the owner to hold on to the dog.

One common method for training and controlling animals on a leash is the choke collar or choke chain. Choke collars restrain animals by choking off breathing to a degree proportional to the strain imposed by the animal on the collar. The choking pressure is eased as the animal relaxes its pull upon the leash.

Choke collars, however, are not the ideal solution to this problem. Many animals will stubbornly fight the choke collar despite the painful pressure it exerts on the animal's throat. As a result, choke collars will often break off and pull out hairs or otherwise damage the skin and/or coat of the animal. Therefore, choke collars are considered by many to be an inhumane method of training an animal to behave on a leash.

SUMMARY OF THE INVENTION

The prevent invention provides a humane and effective system and method for training an animal, such as a dog, to walk on a leash. The system includes a simple electronic device that is attachable to a conventional leash for virtually any size pet. The electronic device generates a loud sound when the animal exerts too much pressure on the leash thereby training the animal to avoid the sound and behave on the leash.

In one aspect of the invention, an animal training device includes an elongate body having opposite ends and a coupling element proximate each end. The coupling elements attach the body to a leash so that the body is adjacent a portion of the leash. A trigger is responsive to a lateral force exerted thereon by the leash so that tensioning of the leash by the animal activates a sound generator within the body. The sound generator emits a sound having a frequency that is preselected to startle the animal when the animal tugs on the leash.

In a preferred embodiment, the coupling elements are a pair of resilient retaining rings that are adapted to slide over the main body on either side of the trigger. The retaining rings are configured to hold the main body at a fixed position on the leash and to substantially articulate the lateral force to the trigger.

The trigger may be configured to activate the sound generator when the animal exerts a threshold force on the leash. Preferably, the trigger includes a dome-shaped button and a trigger stem coupled to the sound generator. The button is dimensioned to optimally transfer a lateral force that exceeds the threshold force to the trigger. The position of the retaining rings along the leash can be adjusted to vary the sensitivity of the button to the lateral force. With this configuration, the trainer can select the appropriate threshold force that will trigger the sound generator.

The sound generator will preferably emit a sound selected to startle the animal, but not so loud and piercing that it causes damages to the animal's ears. Thus, the device provides a safe and humane method of gradually training the animal to avoid the sound and walk safely at the owner's side.

These and other advantages and novel features of the present invention will become apparent from the following detailed description of the invention when considered in conjunction with the accompanying drawings.

DESCRIPTION OF THE PREFERRED EMBODIMENT

Figure 1:
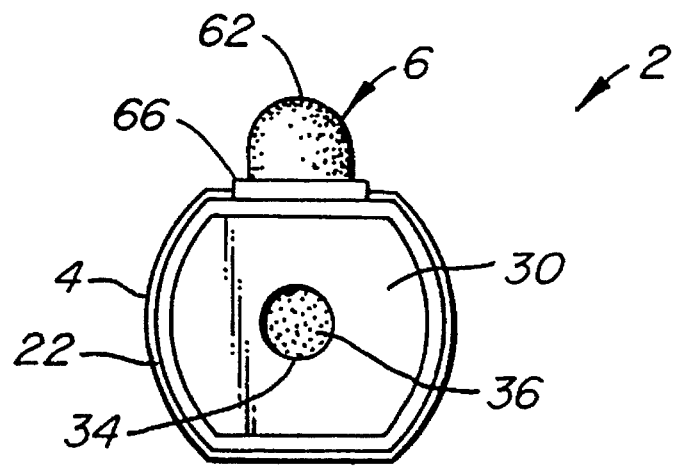
FIG. 1 is a side elevational view of an animal training device in accordance with the invention.

Referring now to the drawings, in which identical or corresponding parts are indicated by the same reference character throughout the drawings, a preferred embodiment of an animal training device 2 is illustrated. Animal training device 2 generally comprises a housing 4, a trigger member 6, and coupling elements 8, 10.

Figure 2:
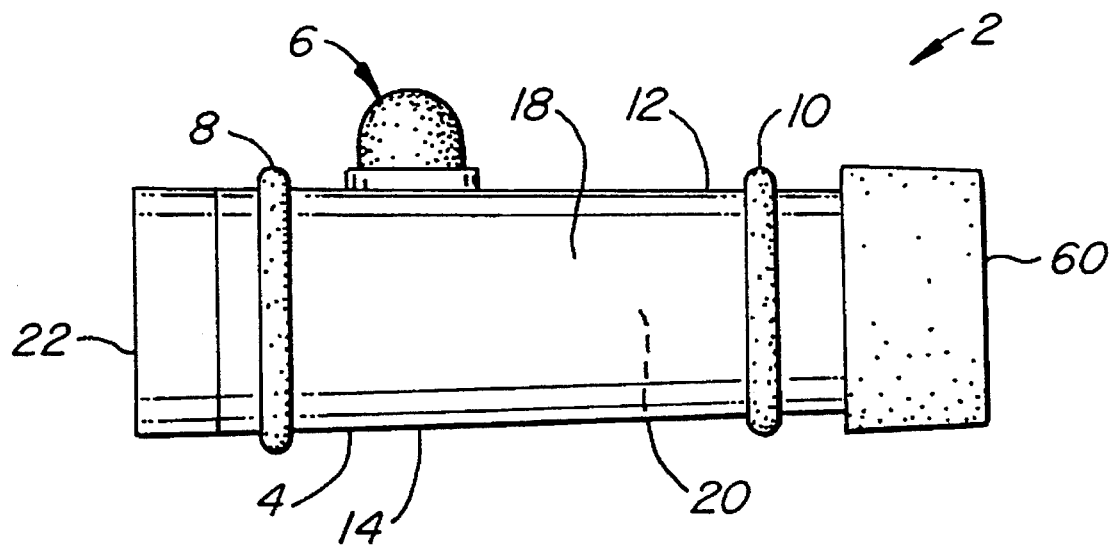
FIG. 2 is a top plan view of the device of FIG. 1.
Figure 3:
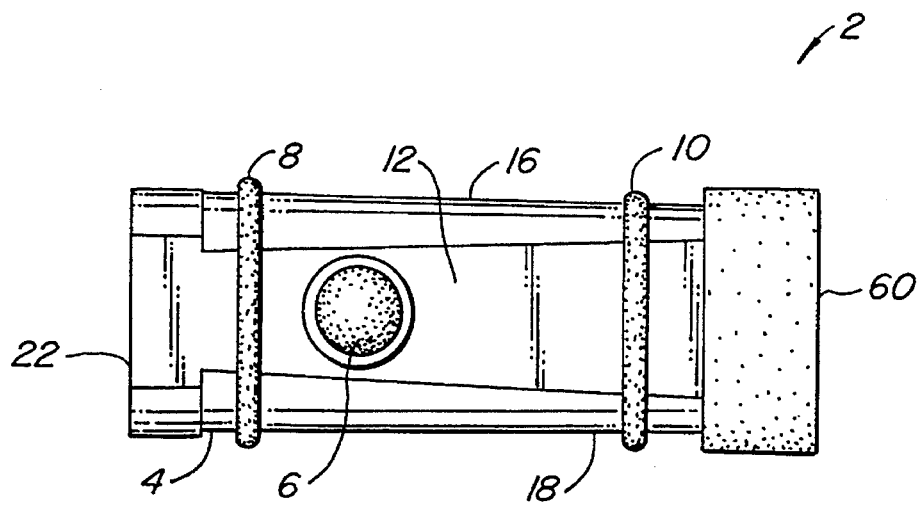
FIG. 3 is front elevational view of the device of FIG. 1.

As shown in FIGS. 1–3, coupling elements 8, 10 are flexible retaining rings that are configured to slide over housing 4 on opposite sides of trigger member 6. The retaining rings are preferably O-rings made from a resilient, elastomeric material such as rubber. In this manner, coupling elements 8, 10 will fix housing 4 to a position along a leash and will also substantially articulate a lateral force applied to the leash to trigger member 6 (described in more detail below). However, it should be noted that other suitable materials may be used for the retaining rings as long as the material sufficiently transfers lateral forces to trigger member 6.

Housing 4 includes an upper wall 12, a lower wall 14, and generally curved side walls 16, 18 which in combination define an internal chamber 20. Side walls 16, 18 extend from a proximal end 22 of housing 4 to a distal end 24. The length of side wall 16 is slightly less than the length of side wall 18 to accommodate a back plate 26, described in more detail below.

Figure 4:
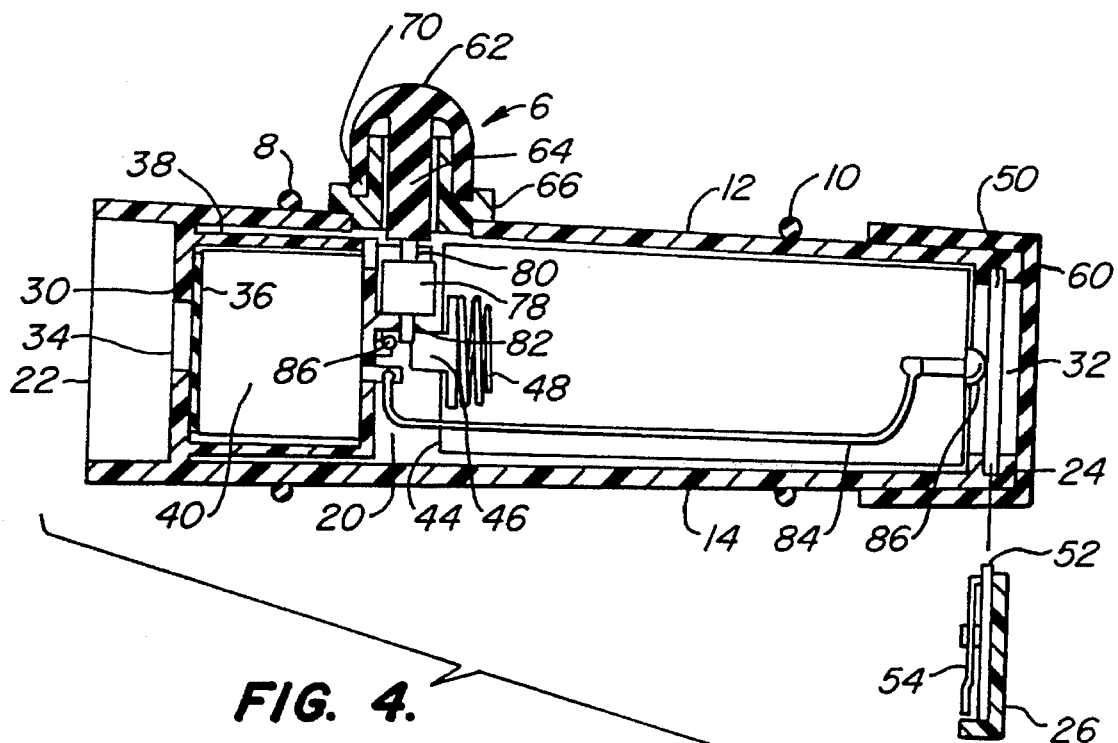
FIG. 4 is a longitudinal cross-sectional view of the device of FIG. 1.

Referring now to FIG. 4, housing 4 is generally elliptical in shape with a closed, front end 30 and an open, back end 32. Front end 30, which is located at a position slightly inward from the proximal end 22 of housing 4, has a small aperture 34 in its center. A buzzer holder 38, preferably made from plastic, is rigidly affixed to front end 30 and is configured to house a standard piezoelectric buzzer 40 therein. A thin section of felt paper 36 is mounted over aperture 34 within holder 38 (the functions served by aperture 34 and felt paper 36 will be described below).

Back end 32 of housing 4 is generally open and is sized to permit passage of a battery 42 (shown schematically in FIG. 5) into a battery holder 44. Battery holder 44 is preferably made from a plastic material and is mounted within chamber 20. As illustrated (see FIG. 4), holder 44 is generally cylindrical and is sized to receive a conventional 1.5 V battery. However, it should be appreciated that the size and shape of holder 44 could be varied to accommodate different types of batteries. A contact 46 and spring 48 are mounted at the proximal end of battery holder 44, as is conventional in the art.

A radial groove 50 is formed in side wall 18 and upper and lower walls 12, 14 proximate distal end 24 of housing 4. A ridge 52 in back plate 26 is adapted to slidably engage with groove 52 so that back plate 26 is movable to a position over the opening in back end 32. A contact plate 54 is mounted to an inner wall of back plate 26 for contacting the positive terminal of battery 42 when battery 42 is placed in battery holder 44. In this way, back plate 26, when positioned across open back end 32, securely positions the battery within battery holder 44. Further, back plate 26 can be slidably removed from back end 32 to provide access into battery holder 44 to allow for the replacement of the battery.

Animal training device 2 also preferably includes a cap 60 which is configured to fit snugly over back end 32 and back plate 26, as shown in FIGS. 1 and 2. Cap 60 is preferably made from a resilient, rubber material so that it may easily be manipulated to sufficiently cover back end 32 (and back plate 26) to thereby seal back end 32 and prevent air and moisture from seeping into chamber 20.

Referring again to FIG. 4, trigger member 6 includes a trigger button 62 and a trigger stem 64. Trigger stem 64 is mounted to a trigger holder 66 for movement of the stem 64 within the holder 66. Trigger holder 66 is preferably glued to the outside of upper wall 16 of housing 4. However, it should be noted that other conventional means, such as rivets or set screws, could be used to couple holder 66 to housing 4. Holder 66 includes an L-shaped, radial flange having a radial support groove 70 for receiving trigger member 6. Trigger button 62 will generally comprise a hemispherical cap which is attached to trigger stem 64 and groove 70 of holder 66. Preferably, trigger button 62 will be dome-shaped and constructed of a resilient elastomeric material, such as rubber. The dome-shape of button 62 is preferable because it allows a lateral force applied to the leash to be optimally transferred to a pressure force acting against trigger stem 64, described in more detail below.

Figure 5:
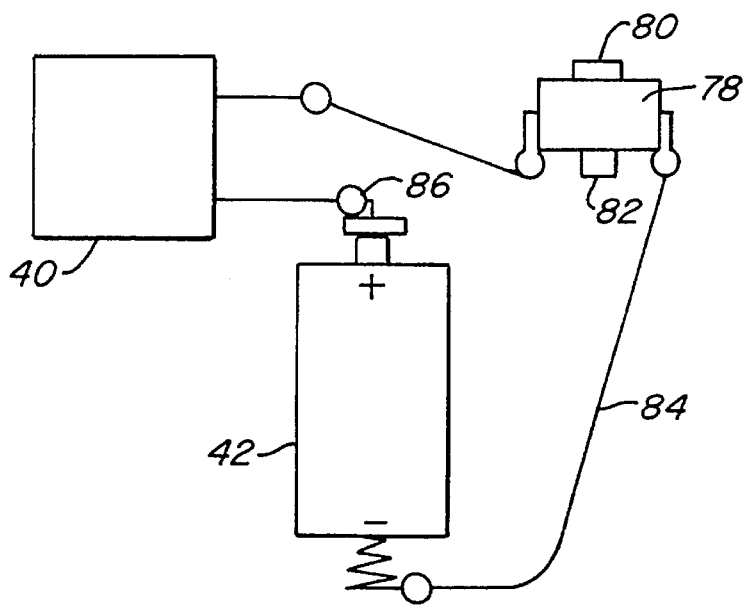
FIG. 5 is a schematic view of an electronic circuit within a housing of the device of FIG. 1.

With reference to FIGS. 4 and 5, a tact switch 78 is movably positioned within chamber 20 proximate the lower end of trigger stem 64. Tact switch 78 includes an actuating button 80 at an upper end of switch 78 adjacent the lower end of trigger stem 64 and a contact button 82 at a lower end of switch 78. Contact button 82 is electrically coupled to contact 46. Tact switch 78 is movable in a substantially transverse direction relative to a the longitudinal axis of housing 4 when trigger stem 64 engages actuating button 80.

Piezoelectric buzzer 40 is located within buzzer holder 38. Buzzer 40 is preferably selected to generate a sound having a frequency in the range of about 4 to 6 KHz. It has been found that a sound having a frequency in this range is sufficiently high-pitched to startle an animal, but is not too loud to hurt the ears of the animal or the person training the animal. Buzzer 40 is electrically coupled to a ground wire 84, which is grounded to the housing 4 via rivet 85 proximate distal end 24 of housing 4. Buzzer 40 also includes a contact member 86 which electrically couples buzzer to contact button 82 of tact switch 78 when the latter has been depressed by trigger stem 64, as described below.

Figure 6:
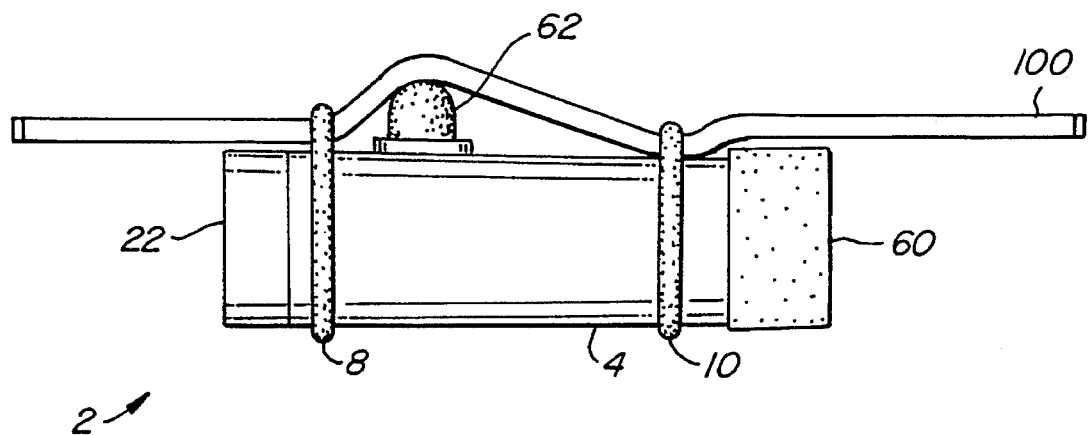
FIG. 6 is a perspective view of the device of FIG. 1 attached to a leash.

In operation, and with reference to FIG. 6, coupling elements 8, 10 are slipped onto a leash 100. As discussed above, coupling elements 8, 10 are preferably flexible retaining rings that are adapted for a wide variety of conventional leashes. The retaining rings will preferably be capable of fitting over leashes having a width between 2–25 mm and a thickness between 25–70 mm. Alternatively, the retaining rings could be positioned directly on the animal's collar (not shown).

Once the retaining rings have been positioned on leash 100, housing 4 is then secured to a portion of the leash by positioning the housing 4 underneath coupling elements 8, 10 with trigger button 62 facing leash 100 so that proximal end 22 of housing 4 is positioned facing the animal. Housing 4 can be positioned anywhere along the length of leash 100 by sliding coupling elements 8, 10 and housing 4 along the leash. However, it has been found in practice that it is preferable to position housing 4 approximately 6–10 inches from the collar of the animal. This distance can be adjusted depending upon the size of the animal and its sensitivity to the sound generated by piezoelectric buzzer 40.

Trigger button 62 is responsive to lateral forces applied by the leash when housing 4 is coupled to the leash 100. When an animal exerts a pulling force on leash 100, a tension force is generated along the length of the leash. Due to the resiliency of coupling elements 8, 10, this tension force is substantially articulated along the portion of leash to which housing 4 is coupled to imposes a lateral force on trigger button 62. Thus, the lateral force creates a downward pressure force against trigger button 62 to press it towards housing 4. Trigger button 62, in turn, forces trigger stem 64 downwards in a plunger-like fashion. Trigger button 62 is configured so that a pressure force of approximately 1 to 2 lb acting on button 62 will move trigger stem 64 sufficiently downwards to activate actuating button 80. Once button 80 is activated, the tact switch 78 is moved downwards so that contact button 82 contacts member 86 to complete the electric connection between battery 42 and piezoelectric buzzer 40 thereby activating buzzer 40.

When the retaining rings are spaced substantially far apart along the length of the housing 4, the threshold pressure force of 1–2 lbs. corresponds to a tension force of approximately 5–10 lbs. However, it is to be appreciated that the tension force required to actuate actuating button 80 can be adjusted by varying the position of the retaining rings along the length of the housing. For example, the sensitivity of the device, i.e., the threshold tension force required to actuate actuating button 80, can be increased by positioning the retaining rings further apart. On the other hand, the closer the retaining rings are positioned to trigger button 62, the lower the threshold tension force required to actuate the actuating button 80.

Operation of piezoelectric buzzer 40 is easily understood by one of ordinary skill in the art. When the electrical connection has been made, the voltage potential generated by the battery causes a piezoelectric crystal (not shown) to undergo periodic variations in thickness, i.e., thickness oscillations, which are transmitted to felt paper 36 covering aperture 34. With this configuration, sound having a frequency in the range of from about 4 to 6 KHz (which is determined from the size of the piezoelectric crystal) will be emitted from buzzer 40.

The animal will typically learn to respond to the sound generated by piezoelectric buzzer 40 by releasing pressure on the leash. This will, in turn, reduce the tension force applied to the leash, and will thereby reduce the lateral force generated on trigger button 62. In this way, trigger stem 64 will be retracted upwardly to thereby release pressure on actuating button 80. When the animal's tension on leash 100 falls below the threshold force, the electrical connection is severed, thereby deactivating the piezoelectric buzzer 40. Thus, the device automatically resets itself for the next significant pull on the leash.

The invention has now been described with reference to the preferred embodiments. Alternatives and substitutions will now be apparent to persons of ordinary skill in the art. For example, an alternative embodiment of the invention may include a device having a spring-activated trigger member that is integrally attached to one end of the leash, preferably that end of the leash which is connected to the animal's collar. In this embodiment, the trigger member is spring biased by a conventional spring assembly relative to a tact switch mounted to the body of the device, which in turn is connected by leads to a signal device. When an animal exerts a threshold force on the leash, this force serves to overcome the set spring force to bring the trigger member in contact with the tact switch which, through the leads, closes the activating circuit for the buzzer.

What is claimed is:

1. An animal training device comprising:

an animal leash having first and second ends;

an elongate body having a longitudinal axis;

a coupling element attaching the body to the leash between the first and second ends;

a sound generator mounted to the body for emitting a sound having a preselected frequency; and a trigger extending radially outward from the body, operably coupled to the sound generator and responsive to a lateral force transverse to the longitudinal axis of the body, the lateral force being applied to the trigger by the leash when the body is attached to the leash and the leash is tensioned by movement of the animal, the trigger activating the sound generator when the tension force reaches a threshold force.

2. The animal training device of claim 1 wherein the trigger includes a dome-shaped button extending laterally from the main body.

3. The animal training device of claim 1 wherein the coupling element includes first and second retaining rings configured to slide over the main body on either side of the trigger.

4. The animal training device of claim 3 wherein the retaining rings are configured to hold the main body at a fixed position on the leash and to substantially transfer the tension force to the trigger.

5. The animal training device of claim 3 wherein the retaining rings are resilient O-rings.

6. The animal training device of claim 1 wherein the coupling element is movable relative to the trigger to vary the threshold force.

7. The animal training device of claim 1 wherein the sound generator includes a piezoelectric buzzer.

8. The animal training device of claim 7 further including a battery source for supplying a voltage potential to the piezoelectric buzzer.

9. The animal training device of claim 8 further including a cover configured to fit over one end of the elongate body to protect the battery source.

10. The animal training device of claim 1 wherein the threshold force is 5–10 lb.

11. An animal training device comprising:

a leash;

an elongate body having opposite ends;

first and second coupling elements proximate each of the opposite ends of the body, the coupling elements attaching the body to the leash so that the body is adjacent a portion of the leash;

a sound generator within the body which emits sound at a preselected frequency when activated; and a trigger member operably coupled to the sound generator and extending laterally from the body to contact the leash, the trigger member being responsive to a force exerted thereon by the leash so that tensioning of the leash activates the sound generator when the tensioning reaches a threshold value, both coupling elements being movable relative to the main body and the trigger member to vary the threshold value.

12. The animal training device of claim 11 wherein the trigger member is dimensioned so that a tension force of 5–10 lbs exerted on the leash will activate the sound generator.

13. An animal training device comprising:

a leash having first and second ends;

an elongate body having opposite ends and a longitudinal axis;

a sound generator within the body which emits sound at a preselected frequency when activated; and a dome-shaped button operably coupled to the sound generator and extending radially outward from the body to contact the leash, the trigger member being responsive to a lateral force applied by the leash when the body is attached to the leash and the leash is tensioned, the trigger activating the sound generator when the tension force reaches a threshold force; and an elastic retaining ring proximate each of the opposite ends of the body, the elastic retaining ring coupling the body to the leash between the first and second ends so that the body is adjacent a portion of the leash, both the retaining rings being movable relative to the trigger and the body to vary the threshold value.

14. The animal training device of claim 13 wherein the retaining rings are configured to attach the body to a leash having a thickness between 2–25 mm and a width between 25–70 mm.

15. A system for training an animal comprising:

a leash having first and second ends, the first end being attachable to an animal collar;

an elongate body having opposite ends and a longitudinal axis;

a coupling element proximate each of the opposite ends of the body to attach the body to the leash between the first and second ends so that the body is adjacent a portion of the leash;

a sound generator within the body which emits sound at a preselected frequency when activated; and a trigger member operably coupled to the sound generator and extending radially outward from the body to contact the leash, the trigger member being responsive to a lateral force exerted thereon by the leash so that tensioning of the leash activates the sound generator.

16. A method for training an animal comprising:

attaching a first end portion of a leash to the animal;

holding a second end portion of the leash;

coupling a main body of an animal training device to the leash between the first and second end portions;

applying a lateral force to a trigger extending from the main body when the leash is tensioned by the animal; and activating a sound generator when the lateral force reaches a threshold value.

* * * * *